(12) United States Patent
Noel et al.

(10) Patent No.: US 10,661,242 B2
(45) Date of Patent: May 26, 2020

(54) LOW-CAPACITY COMPARTMENTALIZED REACTOR

(71) Applicant: IFP Energies Nouvelles, Rueil-Malmaison (FR)

(72) Inventors: Ludovic Noel, Andresy (FR); Cecile Plais, Les Haies (FR); Fabian Lambert, Chatou (FR); Eric Sanchez, Saint Genis Laval (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/490,200

(22) PCT Filed: Jan. 26, 2018

(86) PCT No.: PCT/EP2018/051966
§ 371 (c)(1),
(2) Date: Aug. 30, 2019

(87) PCT Pub. No.: WO2018/158014
PCT Pub. Date: Sep. 7, 2018

(65) Prior Publication Data
US 2020/0038829 A1 Feb. 6, 2020

(30) Foreign Application Priority Data
Mar. 1, 2017 (FR) ...................... 17 51657

(51) Int. Cl.
*B01J 8/02* (2006.01)
*B01J 8/12* (2006.01)
*B01J 19/24* (2006.01)

(52) U.S. Cl.
CPC ........... *B01J 8/0214* (2013.01); *B01J 8/0278* (2013.01); *B01J 8/12* (2013.01); *B01J 19/249* (2013.01);
(Continued)

(58) Field of Classification Search
CPC ................... B01J 8/0214; B01J 8/0278; B01J 2208/00212; B01J 2208/00761; B01J 2208/00884; B01J 8/12; B01J 19/249
(Continued)

(56) References Cited

U.S. PATENT DOCUMENTS 4,225,562 A * 9/1980 Anderson .............. B01J 8/0207
208/146
6,221,320 B1 4/2001 Nagaoka
(Continued)

FOREIGN PATENT DOCUMENTS

FR 2924624 B1 11/2009
FR 3033266 B1 3/2017

OTHER PUBLICATIONS

International Search Report PCT/EP2018/051966 dated Apr. 18, 2018 (pp. 1-4).

*Primary Examiner* — Huy Tram Nguyen
(74) *Attorney, Agent, or Firm* — Millen, White, Zelano and Branigan, P.C.

(57) ABSTRACT

Catalytic reactor (10) with radial flow of a hydrocarbon feedstock to be treated comprising:
a reaction zone (13) enclosed in a substantially cylindrical outer shell (14) that is in the form of at least one catalytic module (15) extending along the vertical axis (AX),
an annular zone (30) located at the same level as said catalytic module (15), outside of the reaction zone (13), said catalytic reactor being characterized in that it comprises an empty space (27) located between two side walls (23, 24) of at least one catalytic module (15), located outside of the reaction zone (13) and opening onto said annular zone (30), said empty space (27) comprising at least one solid net (26)
(Continued)

extending along the vertical axis (AX) and positioned adjacent to the collecting means (29).

<center>15 Claims, 4 Drawing Sheets</center>

(52) U.S. Cl.
 CPC ............... *B01J 2208/00212* (2013.01); *B01J 2208/00761* (2013.01); *B01J 2208/00884* (2013.01)

(58) Field of Classification Search
 USPC .......................................................... 422/218
 See application file for complete search history.

(56) References Cited

U.S. PATENT DOCUMENTS

| | | | |
|---|---|---|---|
| 7,314,603 B2 * | 1/2008 | Filippi | ................... B01J 8/0035 422/198 |
| 10,328,375 B2 | 6/2019 | Bazer-Bachi et al. | |
| 2010/0252482 A1 | 10/2010 | Ferschneider et al. | |

\* cited by examiner

Fig. 1

PRIOR ART

LOW-CAPACITY COMPARTMENTALIZED REACTOR

TECHNICAL FIELD

The present invention relates the field of reactors with radial flow of the hydrocarbon feedstock to be treated. It applies more particularly to the catalytic reforming of gasolines. The invention makes it possible to use very small amounts of catalyst and thus to control residence times of low value.

STATE OF THE ART

Catalytic bed reactors with a radial circulation of the hydrocarbon feedstock to be treated are known in the field of refining. In particular, such reactors are used to carry out catalytic reforming reactions which target the conversion of the C7-C10 paraffinic compounds and C7-C10 naphthenic compounds to give aromatic compounds with the associated hydrogen production. The catalytic conversion is generally carried out at high temperature, of the order of 500° C., at a medium pressure of between 0.1 and 4.0 MPa and in the presence of a specific reforming catalyst so as to produce a high octane number reformate rich in aromatic compounds that can be used as fuel base.

There are multiple constraints linked to moving radial bed technology. In particular, the speeds of the hydrocarbon feedstock to be treated when passing through the catalyst bed are limited to prevent cavitation at the entrance of the bed (when the latter is a moving bed), to prevent pinning of the catalyst at its outlet against the inner screen, and to reduce the pressure drops (dependent on the speed and on the thickness of the bed). Indeed, an excessively high feedstock flow rate will lead to the phenomenon of pinning of a catalyst against the central collector. The force exerted by the feedstock flowing radially from the outer periphery of the catalyst bed toward the center of the reactor presses the catalyst grains against the wall of the central collector, which increases the frictional stress which then opposes the slippage of the grains along the wall. If the feedstock flow is high enough then the resulting frictional force is sufficient to support the weight of the catalyst bed so that the gravity flow of the catalyst grains ceases, at least in some regions adjacent to the wall of the central collector. In these regions, the catalyst grains are then "pinned" by the flow of the feedstock and are held immobile against the wall of the collector. The phenomenon of immobilization of the catalyst grains should very much be avoided in reactors for catalytic reforming of hydrocarbon feedstocks insofar as it promotes reactions for deactivation of the catalyst, for example by coking, thus preventing the continued operation of the reactor. Indeed, when the catalyst cake becomes too thick along the pipe, it is then necessary to reduce the flow of feedstock to be treated or even to completely shut down the unit in order to unclog said pipe.

Document U.S. Pat. No. 6,221,320 discloses a catalytic reactor with flow of the feedstock and with gravity flow of the catalyst comprising a reaction zone comprising a plurality of catalytic modules juxtaposed with one another and regularly distributed inside the reaction zone in the form of a circle. The constraints related to the radial bed technology, as described above, i.e. preventing cavitation at the entrance of the bed, preventing pinning of the catalyst at its outlet against the inner screen, reducing the pressure drops, and the construction constraints of such a reactor (it is necessary to leave sufficient space between the inner screen and the outer screen) impose a minimum volume of catalyst. Consequently, this type of reactor is not optimal for high PPH values, as this would lead to the phenomenon of catalyst pinning against the central collector, given that the entire cross section of the reaction zone comprises a catalyst bed. The maximum PPH value in this type of reactor is of the order of 20 h$^{-1}$.

The objective of the present invention is to propose a new type of catalytic reactor, the design of which makes it possible to work at high PPH values. The Applicant has developed a catalytic reactor with a reaction zone that comprises at least one catalytic module comprising a thin catalyst bed that makes it possible to control the pressure drops and thus makes it possible to increase the PPH value (i.e. the ratio of the flow rate of the feedstock to be treated to the mass of the catalyst) to beyond 40 h$^{-1}$, or even beyond 50 h$^{-1}$, which is much higher than the PPH ranges possible in conventional radial-bed reactors (between 20 and 35 h$^{-1}$).

SUBJECTS OF THE INVENTION

A first subject of the invention relates to a catalytic reactor with radial flow of a hydrocarbon feedstock, said reactor comprising:
- at least one means for introducing said feedstock to be treated;
- at least one means for discharging the effluent resulting from the catalytic reaction;
- a reaction zone enclosed in a substantially cylindrical outer shell that is in the form of at least one catalytic module extending along the vertical axis (AX), said catalytic module comprising:
  - at least one catalyst bed;
  - at least one outer wall and one inner wall, permeable respectively to the feedstock to be treated and to the effluent resulting from the catalytic reaction;
  - at least one first side wall and one second side wall which are impermeable to the feedstock to be treated;
- at least one means for supporting said catalytic module;
- at least one means for collecting the effluent resulting from the catalytic reaction extending along the axis (AX) in communication with said outer wall or said inner wall of said catalytic module;
- an annular zone located at the same level as said catalytic module, outside of the reaction zone, said catalytic reactor being characterized in that:
- when said catalytic reactor comprises a single catalytic module, said reactor comprises an empty space located outside of the reaction zone, between the first side wall and the second side wall of said catalytic module, and opening onto said annular zone,
- when said catalytic reactor comprises a plurality of catalytic modules, said reactor comprises at least one empty space located outside of the reaction zone, between the first side wall of a first catalytic module and the second side wall of a second catalytic module adjacent to the first catalytic module, and opening onto said annular zone, said empty space comprising at least one solid net extending along the vertical axis (AX) and positioned adjacent to the collecting means.

In one embodiment according to the invention, said catalytic module is substantially structured and configured as a sector of a cylinder.

In another embodiment according to the invention, said catalytic module is of rectangular cross section.

Advantageously, said outer and inner walls of said catalytic module consist of Johnson-type screens.

In one embodiment according to the invention, said reactor comprises a plurality of catalytic modules that are structurally independent of one another.

In another embodiment according to the invention, said reactor comprises a single catalytic module.

In this embodiment, the minimum distance "$d_{min}$", measured outside of the reaction zone, defined between the inner stop of the first side wall of the catalytic module and the inner stop of the second side wall of the catalytic module, forming the empty space, is at least 30 cm.

In one embodiment according to the invention, said reactor comprises between 2 and 35 catalytic modules.

In this embodiment, the minimum distance "$d_{min}$", measured outside of the reaction zone, defined between the inner stop of the first side wall of a first catalytic module and the inner stop of the second side wall of an adjacent catalytic module, forming the empty space, is at least 30 cm.

Advantageously, the thickness of the catalyst bed of said catalytic module is less than or equal to 500 mm.

Advantageously, said solid net is in the form of a metal plate.

In one embodiment according to the invention, said catalytic module further comprises:
- at least one catalyst inlet means located in the upper part of said catalytic module;
- at least one catalyst outlet means located in the lower part of said catalytic module.

Another subject according to the invention relates to a process for the catalytic reforming of a hydrocarbon feedstock using the catalytic reactor according to the invention, wherein:
- the hydrocarbon feedstock, in gaseous form, is continuously sent into a catalyst bed contained in the reactor;
- the hydrocarbon feedstock passing radially through the catalyst bed is brought into contact with the catalyst so as to produce a gaseous effluent;
- said effluent is drawn off after passing through the collection duct.

Preferably, the ratio of the flow rate of the hydrocarbon feedstock to be treated to the mass of the catalyst is greater than or equal to 20 $h^{-1}$.

Advantageously, said process is carried out at a temperature of between 400° C. and 600° C., at a pressure of between 0.1 MPa and 4 MPa, and with a hydrogen/hydrocarbons of the feedstock to be treated molar ratio of between 0.1 and 10.

BRIEF DESCRIPTION OF THE DRAWINGS

The other features and advantages of the invention will become apparent from reading the following description, given solely by way of nonlimiting illustration, and to which are attached.

DETAILED DESCRIPTION OF THE INVENTION

Definition

For the purposes of the present invention, radial flow is understood to mean a flow of the hydrocarbon feedstock to be treated that goes through a catalyst bed, generally a moving bed, in a set of directions corresponding either to radii oriented from the periphery toward the center of the chamber (centripetal radial circulation) or to radii oriented from the center of the chamber toward the periphery (centrifugal radial circulation).

Reactor

Figure 1:
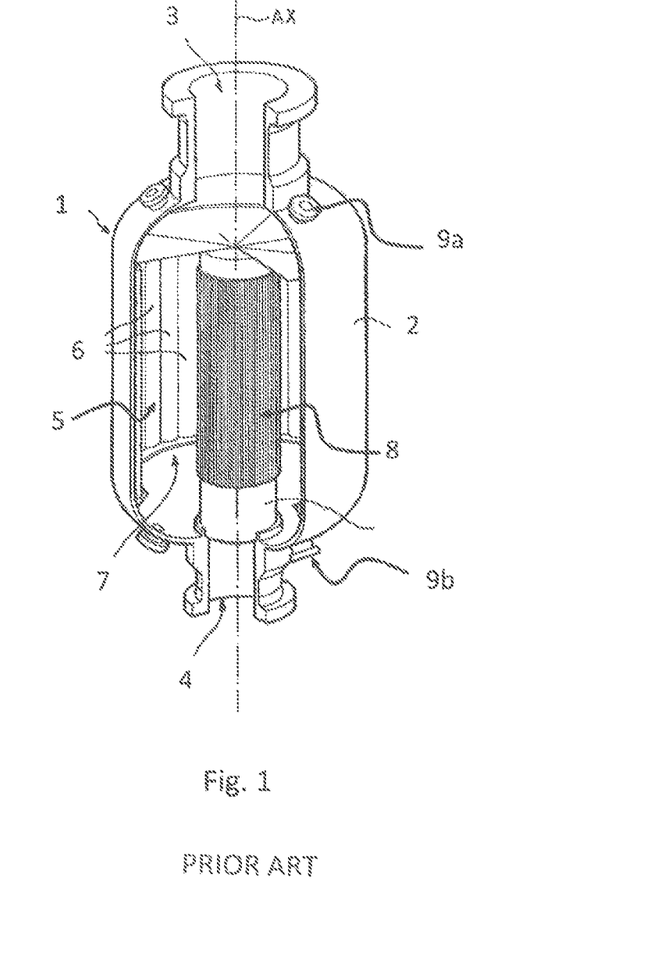
FIG. 1 is an exploded perspective view of a radial flow reactor according to the prior art.

Referring to FIG. 1, a radial flow reactor 1 according to the prior art is externally in the form of a gas cylinder forming a substantially cylindrical outer shell 2 extending along an axis of symmetry AX. The chamber 2 comprises in its upper part a means 3 for introducing the feedstock to be treated and in its lower part a means 4 for discharging the effluent resulting from the catalytic reaction. Arranged inside the chamber 2 is a catalyst bed 7 having the shape of a vertical cylindrical ring limited on the inside by a central cylindrical tube 8 formed by a so-called "inner" screen that retains the catalyst and the outer side by another so-called "outer" screen 5 either of the same type as the inner screen, or by a device consisting of an assembly of shell-shaped screen members 6 extending longitudinally, as represented in FIG. 1. These shell-shaped screen elements 6 that form ducts are also known as "scallops". These ducts 6 are held by the reservoir and pinned to the inner face of the chamber, parallel to the axis AX, in order to form a substantially cylindrical inner shell. The shell-shaped screen elements 6 are in direct communication with the means 3 for introducing the feedstock to be treated via the upper end thereof, in order to receive the flow of feedstock be treated. The flow of feedstock, in gaseous form, diffuses through the perforated wall of the ducts 6, to pass through the bed of solid catalyst particles 7 while converging radially toward the center of the reactor 1. The feedstock is thus brought into contact with the catalyst in order to undergo chemical transformations, for example a catalytic reforming reaction, and to produce a reaction effluent. The reaction effluent is then collected by the central cylindrical tube 8 (or collection duct) extending along the axis AX and also having a perforated wall. This central cylinder 8 (or collection duct) is here in communication with the discharge means 4 of the reactor via the lower end thereof.

In operation, the feedstock to be treated introduced into the introduction means 3 passes radially through the "outer" screen 5, then passes radially through the bed of catalyst particles 7 where it is brought into contact with the catalyst in order to produce an effluent which is subsequently collected by the central cylinder 8 and discharged by the discharge means 4. Such a reactor may also operate with a continuous gravity flow of catalyst in the annular catalyst bed 7. In the case of FIG. 1, the reactor 1 further comprises means 9a for introducing the catalyst into the annular bed, arranged in an upper part of the reactor and means 9b for drawing off the catalyst which are arranged in a lower part of the reactor.

A catalytic reactor 10 according to the invention is represented in FIGS. 2 to 6. In this embodiment, the catalytic reactor 10 with radial flow of a hydrocarbon feedstock to be treated comprises at least:

- a means for introducing said feedstock to be treated that is in the form of a pipe located in the upper part of the reactor;
- a reaction zone 13 enclosed in a substantially cylindrical outer shell 14 that is in the form of at least one catalytic module 15 extending along the vertical axis (AX) in which a catalyst bed 16 is enclosed;
- an annular zone 30 located at the same level as said catalytic module, outside of the reaction zone 13;
- a means 25 for supporting said catalytic module 15;
- a collection means 29 extending along the vertical axis (AX) for collecting the effluent resulting from the catalytic reaction;
- a means for discharging the effluent resulting from the catalytic reaction, said means being in the form of a pipe situated in the lower part of the reactor;
- at least one empty space 27, located outside the reaction zone 13, and opening onto said annular zone 30, said empty space 27 comprising at least one solid net 26 extending along the vertical axis (AX) and positioned adjacent to the collecting means 29.

Figure 2A:
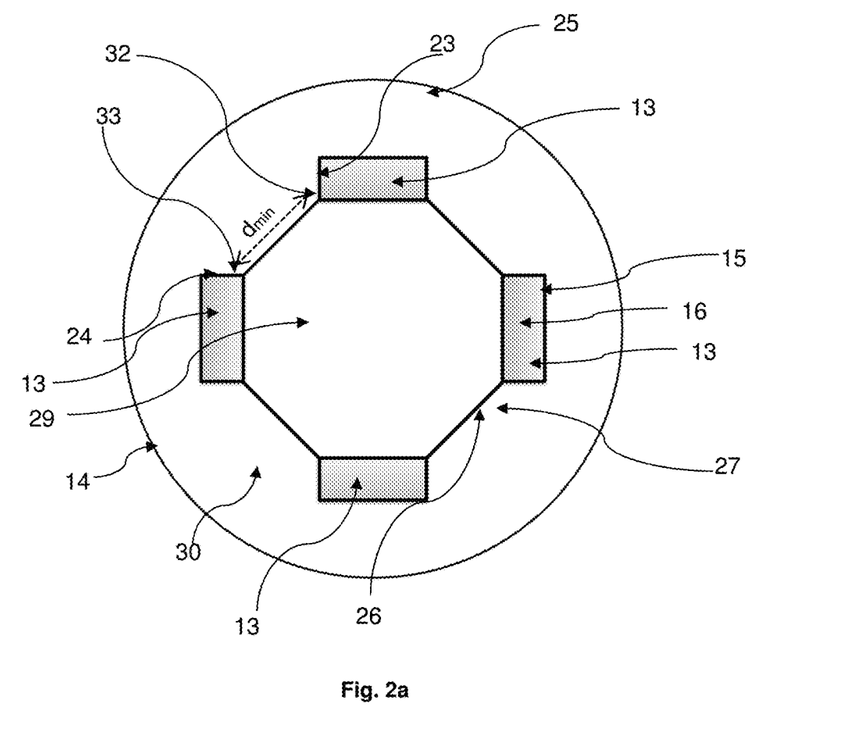
FIGS. 2a and 2b each respectively represent a cross-sectional view of a radial flow reactor according to the invention in a plane perpendicular with respect to the main axis of the reactor, in which the catalytic modules are of rectangular cross section (FIG. 2a) or are substantially structured and configured as a sector of a cylinder (FIG. 2b).
Figure 2B:
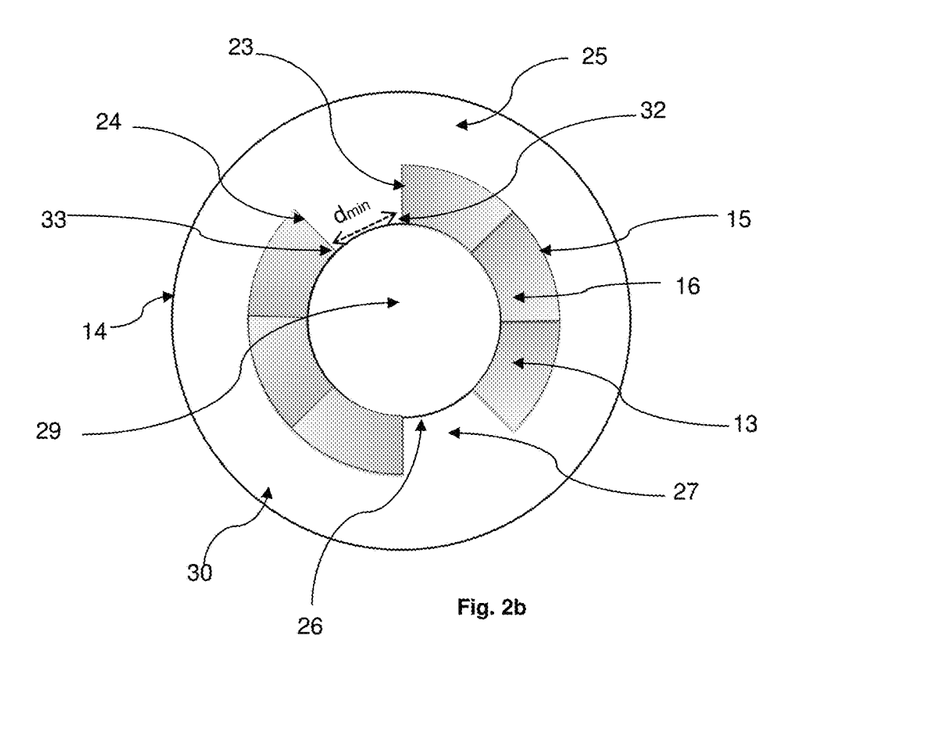
Figure 3:
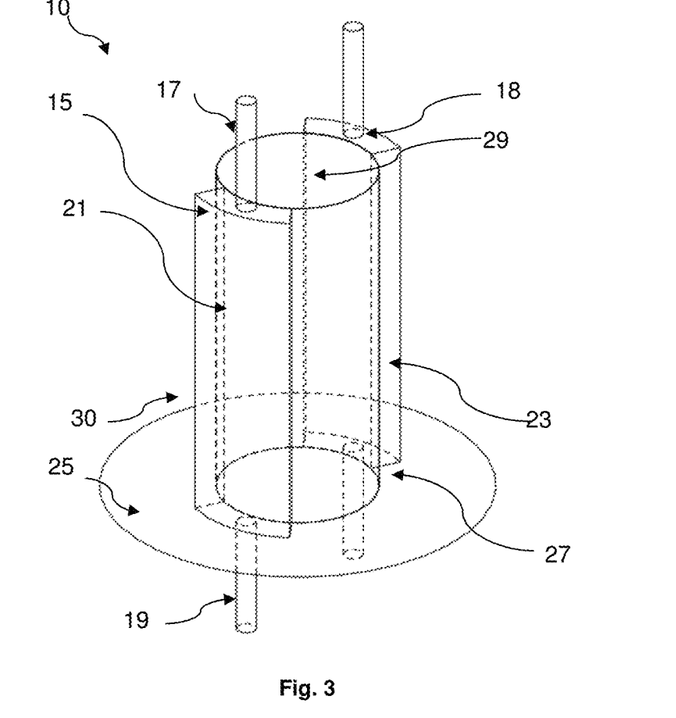
FIG. 3 is an exploded perspective view of a portion of the radial flow reactor according to one embodiment of the invention wherein the catalytic modules have a cross section that is substantially structured and configured as a sector of a cylinder (FIG. 2b).
Figure 4:
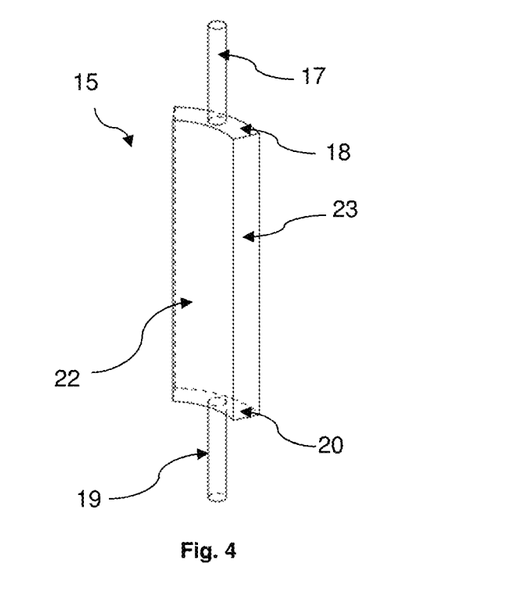
FIG. 4 is a perspective view of a catalytic module of the reactor according to the invention corresponding to the embodiment according to FIG. 2b.

In one embodiment according to the invention, said catalytic module 15 is of rectangular cross section (cf. FIG. 2a). In another embodiment according to the invention, said catalytic module 15 is substantially structured and configured as a sector of a cylinder (cf. FIG. 2b). Whether it is one or the other of the embodiments, the catalytic module 15 is delimited by:

- an outer wall 21 and an inner wall 22, said walls 21 and 22 being permeable respectively to the feedstock to be treated and to the effluent resulting from the catalytic reaction;
- two side walls 23 and 24 impermeable to the feedstock to be treated;
- an upper part 18 and a lower part 20 impermeable to the feedstock to be treated.

The outer 21 and inner 22 walls of the catalytic module 15 preferably consist of Johnson-type screens.

Such an arrangement of the catalytic reactor makes it possible to significantly reduce the thickness "e" of the catalyst bed 16 included in said catalytic module 15. More particularly, the thickness "e" of the catalyst bed 16 is less than or equal to 500 mm, preferably less than or equal to 400 mm, more preferably less than or equal to 300 mm and even more preferably less than or equal to 200 mm. The thinness of the catalyst bed included in said catalytic module 15 thus makes it possible to better control the pressure drops and thus makes it possible to increase the PPH to a value greater than or equal to 20 h$^{-1}$, preferably greater than or equal to 50 h$^{-1}$, more preferably greater than or equal to 100 h$^{-1}$, is even more preferably greater than or equal to 200 h$^{-1}$.

However, the presence of a reactor comprising a reaction zone with a thin catalyst bed does not make it possible to perform maintenance and inspection operations inside the catalytic modules 15. Thus, the presence of at least one empty space 27 at the same level as the reaction zone 13 makes it possible to facilitate the inspection and/or the maintenance of the collection means and of the catalytic modules 15.

When the reactor according to the invention comprises a single catalytic module (embodiment not represented in the figures) said reactor comprises an empty space 27 located outside of the reaction zone 13, between the first side wall 23 and the second side wall 24 of said catalytic module 15, and opening onto said annular zone 30. In this embodiment, the minimum distance "$d_{min}$" defined between the inner stop 32 of the first side wall 23 of the catalytic module 15 and the inner stop 33 of the second side wall 24 of the catalytic module 15, forming the empty space 27, is at least 30 cm, preferably at least 50 cm.

The empty space 27 further comprises at least one solid net 26 extending along the vertical axis (AX) positioned adjacent to the collection duct 29. Within the context of the invention, said solid net 26 is an element which is impermeable to the hydrocarbon feedstock to be treated, that is in the form of a gaseous fluid. For example, the solid net 26 is in the form of a metal plate fixed on the outer part of the collection duct 29, so that said solid net 26 prevents the hydrocarbon feedstock from passing into the collection duct 29. Within the context of the invention, the height of said solid net 26 is substantially equal to the height of said catalytic module 15. The solid net 26 may also be removable so as to be able to facilitate the maintenance operations in the reactor.

In one particular embodiment according to the invention, the side wall 23 of the catalytic module 15, the solid net 26, and the side wall 24 of the catalytic module 15 form a single component in order to improve the sealing of the reaction zone 13.

In one particular embodiment according to the invention, as illustrated in FIGS. 2a and 2b, the reaction zone 13 of the catalytic reactor 10 comprises a plurality of catalytic modules 15 that are structurally independent of one another. The reaction zone 13 may comprise between 1 and 35 catalytic module(s) 15, preferably between 2 and 20 catalytic modules. The presence of several catalytic modules 15 also makes it possible to envisage blocking one thereof off in the event of failure, while continuing to operate the system on the other catalytic modules. Preferably, each catalytic module is of identical structure and shape (either of rectangular cross section or structured and configured as a sector of a cylinder).

When the device according to the invention comprises a plurality of catalytic modules 15, said reactor comprises at least one empty space 27 located outside of the reaction zone 13, between the first side wall 23 of a first catalytic module 15 and the second side wall 24 of a second catalytic module 15 adjacent to the first catalytic module 15, and opening onto said annular zone 30. In this embodiment, the minimum distance "$d_{min}$" defined between the inner stop 32 of the first side wall 23 of a first catalytic module 15 and the inner stop 33 of the second side wall 24 of a second catalytic module 15 adjacent to the first catalytic module (as illustrated in FIG. 2a or 2b), forming the empty space 27, is at least 30 cm, preferably at least 50 cm. In the same way as the preceding embodiments, the empty space 27 comprises at least one solid net 26 extending along the vertical axis (AX) positioned adjacent to the collection duct 29. The technical features of the solid net 26 are identical to those of the solid net as described above.

It should be noted that the catalyst may be a fixed catalyst bed reactor or a moving catalyst bed reactor, i.e. the catalyst is introduced into the reactor and drawn off from the reactor continuously. In the particular embodiment in which the reactor is a moving catalyst bed reactor, the catalyst may be introduced into the catalytic module 15 via an inlet pipe 17 located in the upper part 18 of the catalytic module. It may be discharged from the catalytic module 15 via an outlet pipe 19 located in the lower part of the catalytic module.

Thus, the catalytic reactor according to the invention makes it possible to achieve the objectives of high PPH values in order to optimize the reaction performance of the process, while at the same time offering a realistic, adjustable, easy maintenance mechanical design, comprising small amounts of catalyst.

Process

The reactor according to the invention may be used in reactions with radial flow of gaseous fluid such as, for example, a reaction for catalytic reforming of a hydrocarbon feedstock, a skeletal isomerization of olefins, metathesis for the production of propylene, an oligocracking reaction.

More particularly, the invention also relates to a process for the catalytic reforming of a hydrocarbon feedstock using the reactor according to the invention. The reactor according to the invention may indeed be used in processes for reforming gasolines and for producing aromatic compounds. The reforming processes make it possible to increase the octane number of the gasoline fractions originating from the distillation of crude oil and/or from other refining processes such as, for example, catalytic cracking or thermal cracking. The processes for producing aromatics provide the base products (benzene, toluene, xylenes) that can be used in the petrochemical industry. These processes have an additional benefit, contributing to the production of large amounts of hydrogen, essential for refinery hydrotreating or hydroconversion processes.

The feedstock to be treated generally contains paraffinic, naphthenic and aromatic hydrocarbons containing from 5 to 12 carbon atoms per molecule. This feedstock is defined, inter alia, by its density and its composition by weight. These feedstocks may have an initial boiling point of between 40° C. and 70° C. and a final boiling point of between 160° C. and 220° C. They may also be formed by a gasoline fraction or mixture of gasoline fractions having initial and final boiling points between 40° C. and 220° C. The feedstock to be treated may thus also be formed by a heavy naphtha having a boiling point of between 160° C. and 200° C.

Typically, the feedstock is introduced into the reactor in the presence of hydrogen and with a hydrogen/hydrocarbons of the feedstock molar ratio generally of between 0.1 and 10, preferably between 1 and 8. The operating conditions of the reforming are generally as follows: a temperature of preferably between 400° C. and 600° C., more preferably between 450° C. and 540° C., and a pressure of preferably between 0.1 MPa and 4 MPa and more preferably between 0.25 MPa and 3.0 MPa. All or some of the hydrogen produced can be recycled at the inlet of the reforming reactor. The ratio of the flow rate of the hydrocarbon feedstock to be treated to the mass of the catalyst is greater than or equal to 20 $h^{-1}$, preferably greater than or equal to 50 $h^{-1}$, more preferably greater than or equal to 100 $h^{-1}$, and even more preferably greater than or equal to 200 $h^{-1}$.

Figure 5:
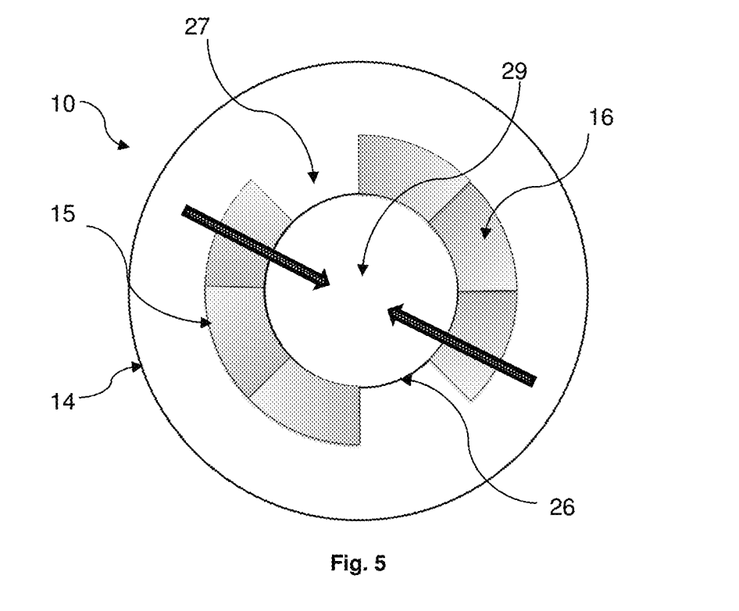
FIG. 5 is a cross-sectional view of a reactor according to the invention along a plane perpendicular with respect to the main axis of the reactor in which the reactor has centripetal radial circulation.
Figure 6:
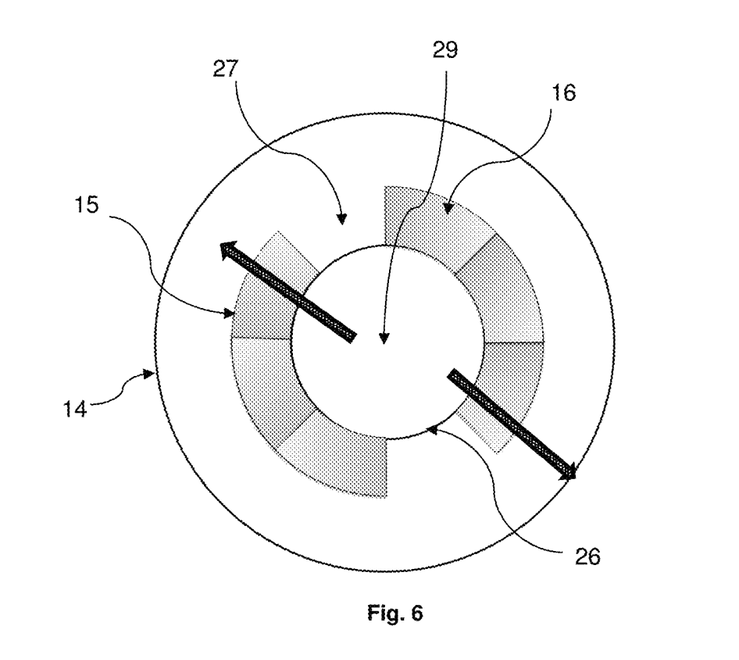
FIG. 6 is a cross-sectional view of a reactor according to the invention along a plane perpendicular with respect to the main axis of the reactor in which the reactor has centrifugal radial circulation.

A first embodiment of the reactor is represented in FIG. 5, the reactor having centripetal radial circulation (i.e. the gas stream flows from the periphery of the chamber towards the center of the chamber). In operation, the hydrocarbon feedstock, in gaseous form, is injected either through the bottom or through the top of the reactor into the annular zone 30 and then passes through the outer wall 21 of said at least one catalytic module 15 and then passes substantially radially through the bed of catalyst particles located in said catalytic module 15. In the catalytic module 15 the gaseous fluid is brought into contact with the catalyst to produce a generally gaseous, reaction effluent, which is collected in the space of the collection duct 29 which is then drawn off either at the top of the reactor (when the feedstock is introduced at the bottom of the reactor) or at the bottom of the reactor (when the feedstock is introduced through the top of the reactor).

Another embodiment of the reactor according to the invention (represented in FIG. 6) is a reactor having centrifugal radial circulation (i.e. the gas stream flows from the center of the chamber towards the periphery of the chamber). In operation, the hydrocarbon feedstock, in gaseous form, is introduced either through the top or through the bottom of the reactor via the inner wall 22 of the catalytic module 15. The feedstock diffuses through the inner wall 22 and passes substantially radially through the catalyst bed within the catalytic module 15. A reaction effluent is collected in the annular zone 30 serving as a collection duct and then is drawn off either at the top of the reactor (when the feedstock is introduced at the bottom of the reactor) or at the bottom of the reactor (when the feedstock is introduced at the top of the reactor).

The invention claimed is:

1. A catalytic reactor (10) with radial flow of a hydrocarbon feedstock, said reactor comprising:
   at least one means for introducing said feedstock to be treated;
   at least one means for discharging the effluent resulting from the catalytic reaction;
   a reaction zone (13) enclosed in a substantially cylindrical outer shell (14) that is in the form of at least one catalytic module (15) extending along the vertical axis (AX), said catalytic module (15) comprising:
      at least one catalyst bed (16);
      at least one outer wall (21) and one inner wall (22) permeable respectively to the feedstock to be treated and to the effluent resulting from the catalytic reaction;
      at least one first side wall (23) and one second side wall (24) impermeable to the feedstock to be treated;
   at least one means (25) for supporting said catalytic module (15);
   at least one means (29) for collecting the effluent resulting from the catalytic reaction extending along the axis (AX) in communication with said outer wall (21) or said inner wall (22) of said catalytic module (15);
   an annular zone (30) located at the same level as said catalytic module (15), outside of the reaction zone (13),
   said catalytic reactor being characterized in that:
   when said catalytic reactor comprises a single catalytic module (15), said reactor comprises an empty space (27) located outside of the reaction zone (13), between the first side wall (23) and the second side wall (24) of said catalytic module (15), and opening onto said annular zone (30),
   when said catalytic reactor comprises a plurality of catalytic modules (15), said reactor comprises at least one empty space (27) located outside of the reaction zone (13), between the first side wall (23) of a first catalytic module (15) and the second side wall (24) of a second catalytic module (15) adjacent to the first catalytic module (15), and opening onto said annular zone (30), said empty space (27) comprising at least one solid net (26) extending along the vertical axis (AX) and positioned adjacent to the collecting means (29).

2. The catalytic reactor as claimed in claim 1, characterized in that said catalytic module (15) is substantially structured and configured as a sector of a cylinder.

3. The catalytic reactor as claimed in claim 1, characterized in that said catalytic module (15) is of rectangular cross section.

4. The catalytic reactor as claimed in claim 1, characterized in that said outer (21) and inner (22) walls of said catalytic module (15) consist of Johnson-type screens.

5. The catalytic reactor as claimed in claim 1, characterized in that it comprises a plurality of catalytic modules (15) that are structurally independent of one another.

6. The catalytic reactor as claimed in claim 1, characterized in that it comprises a single catalytic module (15).

7. The catalytic reactor as claimed in claim 6, characterized in that the minimum distance "$d_{min}$", measured outside of the reaction zone (13), defined between the inner stop (32) of the first side wall (23) of the catalytic module (15) and the inner stop (33) of the second side wall (24) of the catalytic module (15), forming the empty space (27), is at least 30 cm.

8. The catalytic reactor as claimed in claim 1, characterized in that it comprises between 2 and 35 catalytic modules (15).

9. The catalytic reactor as claimed in claim 8, characterized in that it comprises a minimum distance "$d_{min}$", measured outside of the reaction zone (13), defined between the inner stop (32) of the first side wall (23) of a first catalytic module (15) and the inner stop (33) of the second side wall (24) of an adjacent catalytic module (15), forming the empty space (27), is at least 30 cm.

10. The catalytic reactor as claimed in claim 1, characterized in that the thickness of the catalyst bed (16) of said catalytic module (15) is less than or equal to 500 mm.

11. The catalytic reactor as claimed in claim 1, characterized in that said solid net (26) is in the form of a metal plate.

12. The reactor as claimed in claim 1, characterized in that said catalytic module (15) further comprises:
at least one catalyst inlet means (17) located in the upper part (18) of said catalytic module;
at least one catalyst outlet means (19) located in the lower part (20) of said catalytic module.

13. A process for the catalytic reforming of a hydrocarbon feedstock using the catalytic reactor as claimed in claim 1, wherein:
the hydrocarbon feedstock, in gaseous form, is continuously sent into a catalyst bed contained in the reactor;
the hydrocarbon feedstock passing radially through the catalyst bed is brought into contact with the catalyst so as to produce a gaseous effluent;
said effluent is drawn off after passing through the collection duct.

14. The process as claimed in claim 13, characterized in that the ratio of the flow rate of the hydrocarbon feedstock to be treated to the mass of the catalyst is greater than or equal to 20 $h^{-1}$.

15. The process as claimed in claim 13, characterized in that said process is carried out at a temperature of between 400° C. and 600° C., at a pressure of between 0.1 MPa and 4 MPa, and with a hydrogen/hydrocarbons of the feedstock to be treated molar ratio of between 0.1 and 10.

* * * * *